US012560722B2

(12) United States Patent
Huang et al.

(10) Patent No.: US 12,560,722 B2
(45) Date of Patent: Feb. 24, 2026

(54) LiDAR SYSTEM AND AUTONOMOUS DRIVING DEVICE

(71) Applicant: SUTENG INNOVATION TECHNOLOGY CO., LTD., Shenzhen (CN)

(72) Inventors: Maonan Huang, Shenzhen (CN); Simei Li, Shenzhen (CN); Lei Gan, Shenzhen (CN); Yuanyuan Wang, Shenzhen (CN); Hao Wu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/093,206

(22) Filed: Mar. 27, 2025

(65) Prior Publication Data

US 2025/0306211 A1      Oct. 2, 2025

(30) Foreign Application Priority Data

Apr. 1, 2024    (CN) .......................... 202410384282.3

(51) Int. Cl.
*G01S 17/931*            (2020.01)
(52) U.S. Cl.
CPC ................................... *G01S 17/931* (2020.01)
(58) Field of Classification Search
CPC .................................................... G01S 17/931
See application file for complete search history.

(56) References Cited

U.S. PATENT DOCUMENTS

| | | | | |
|---|---|---|---|---|
| 11,971,507 B2 * | 4/2024 | Avlas | .................... | G01S 7/4876 |
| 12,130,382 B2 * | 10/2024 | Gong | .................... | G01S 7/4802 |
| 2018/0120433 A1 * | 5/2018 | Eichenholz | ............. | G01S 17/26 |
| 2020/0284883 A1 * | 9/2020 | Ferreira | ................ | G01S 7/4815 |
| 2021/0006332 A1 * | 1/2021 | Pandit | .................... | H04B 10/11 |
| 2021/0011129 A1 * | 1/2021 | Nauen | ................... | G01S 17/003 |
| 2021/0190925 A1 * | 6/2021 | Asghari | ................. | G01S 7/499 |
| 2024/0161511 A1 * | 5/2024 | Gangundi | ............. | G01S 17/931 |

* cited by examiner

*Primary Examiner* — Peter D Nolan
*Assistant Examiner* — Demetra R Smith-Stewart
(74) *Attorney, Agent, or Firm* — BAYES PLLC

(57)        ABSTRACT

A LiDAR system and an autonomous driving device are provided. The LiDAR system includes a first LiDAR and a second LiDAR. The LiDAR includes a first transmission port and a second transmission port. The first LiDAR is configured to send a control instruction to the first transmission port or the second transmission port of the second LiDAR through the first transmission port of the first LiDAR, and the first LiDAR is also configured to receive a first echo signal. The second LiDAR is configured to emit a laser beam according to the control instruction, and receive a second echo signal according to the laser beam, and the second LiDAR is also configured to transmit the second echo signal to the first LiDAR. The first LiDAR is configured to perform data fusion according to the first echo signal and the second echo signal to obtain the echo signal after data fusion.

10 Claims, 7 Drawing Sheets

LiDAR SYSTEM AND AUTONOMOUS DRIVING DEVICE

CROSS-REFERENCE TO RELATED APPLICATION

The present application claims the benefit of priority to Chinese Patent Application No. 202410384282.3, filed on Apr. 1, 2024, which is hereby incorporated by reference in its entirety.

TECHNICAL FIELD

The present application relates to the field of LiDAR, and in particular to a LiDAR system and autonomous driving device.

BACKGROUND

With the continuous development of autonomous driving technology, LiDAR with high-precision and high-sensitivity has become one of the core sensors in autonomous driving device. The expansion of LiDAR applications in the field of autonomous driving has greatly improved the level of intelligent driving and safety performance.

Currently, mainstream intelligent driving solutions typically rely on LiDAR combined with millimeter-wave radars and cameras to form a perception system. However, a single LiDAR can only detect road information within a limited angular and distance range in front of the vehicle, while millimeter-wave radars and cameras suffer from insufficient detection accuracy. Although adding multiple LiDARs can collect environmental information in a larger range, the coordination between multiple LiDARs still faces great challenges. And the wiring, power supply, and debugging processes of multiple LiDARs are complicated, which increase the cost of the vehicle.

SUMMARY

To enable coordinated operation of multiple LiDARs, embodiments of the present application disclose a LiDAR system and autonomous driving device.

In a first aspect, an embodiment of the present application discloses a LiDAR system, the system including a first LiDAR and a second LiDAR, where each LiDAR includes a first transmission port and a second transmission port. The first LiDAR is configured to send a control instruction to the first transmission port of the second LiDAR or the second transmission port of the second LiDAR through the first transmission port of the first LiDAR, and the first LiDAR is also configured to receive a first echo signal. The second LiDAR is configured to emit a laser beam according to the control instruction and receive the second echo signal; the second LiDAR is further configured to transmit the second echo signal to the first LiDAR; and the first LiDAR is further configured to perform data fusion according to the first echo signal and the second echo signal to obtain the echo signal after data fusion.

In some embodiments, the system further includes a third LiDAR, where the first transmission port of the first LiDAR and the second transmission port of the second LiDAR are electrically connected, the first transmission port of the second LiDAR and the second transmission port of the third LiDAR are electrically connected, and the first transmission port of the third LiDAR and the second transmission port of the first LiDAR are electrically connected. Each LiDAR can exchange data with another LiDAR through one of the two transmission ports, effectively improving the stability and reliability of the system.

In some embodiments, the system further includes a first Ethernet switch, where the first Ethernet switch includes a first Ethernet port and a second Ethernet port; the first transmission port of the first LiDAR and the second transmission port of the second LiDAR are electrically connected, and the first transmission port of the second LiDAR and the first Ethernet port of the first Ethernet switch are electrically connected. The second Ethernet port of the first Ethernet switch and the second transmission port of the third LiDAR are electrically connected, and the first transmission port of the third LiDAR and the second transmission port of the first LiDAR are electrically connected. The Ethernet switches can coordinate the timing and transmission rate of data transmission to prevent congestion in the transmission link.

In some embodiments, the system further includes a fourth LiDAR, and the first Ethernet switch additionally includes a third Ethernet port and a fourth Ethernet port, where the first transmission port of the first LiDAR and the second transmission port of the second LiDAR are electrically connected, the first transmission port of the second LiDAR and the first Ethernet port of the first Ethernet switch are electrically connected, and the second Ethernet port of the first Ethernet switch and the second transmission port of the first LiDAR are electrically connected. The first transmission port of the third LiDAR and the second transmission port of the fourth LiDAR are electrically connected, the first transmission port of the fourth LiDAR and the third Ethernet port of the first Ethernet switch are electrically connected, and the fourth Ethernet port of the first Ethernet switch and the second transmission port of the third LiDAR are electrically connected.

In some embodiments, the system further includes a second Ethernet switch, and the Ethernet switch additionally includes a third Ethernet port. The first transmission port of the first LiDAR and the first Ethernet port of the first Ethernet switch are electrically connected, and the second transmission port of the first LiDAR and the first Ethernet port of the second Ethernet switch are electrically connected. The first transmission port of the second LiDAR and the second Ethernet port of the first Ethernet switch are electrically connected, and the second transmission port of the second LiDAR and the second Ethernet port of the second Ethernet switch are electrically connected. The first transmission port of the third LiDAR and the third Ethernet port of the first Ethernet switch are electrically connected, and the second transmission port of the third LiDAR and the third Ethernet port of the second Ethernet switch are electrically connected.

In some embodiments, the system further includes a fourth LiDAR, and each Ethernet switch additionally includes a fourth Ethernet port, where the first transmission port of the fourth LiDAR and the fourth Ethernet port of the first Ethernet switch are electrically connected, and the second transmission port of the fourth LiDAR and the fourth Ethernet port of the second Ethernet switch are electrically connected.

In some embodiments, the system further includes a fourth LiDAR and a fifth LiDAR, where the first transmission port of the first LiDAR and the first Ethernet port of the first Ethernet switch are electrically connected, and the second transmission port of the first LiDAR and the first Ethernet port of the second Ethernet switch are electrically connected. The second Ethernet port of the first Ethernet switch and the first transmission port of the second LiDAR are electrically connected, the second transmission port of the second LiDAR and the first transmission port of the fifth LiDAR are electrically connected, and the second transmission port of the fifth LiDAR and the second Ethernet port of the second Ethernet switch are electrically connected. The third Ethernet port of the second Ethernet switch and the second transmission port of the fourth LiDAR are electrically connected, the first transmission port of the fourth LiDAR and the second transmission port of the third LiDAR are electrically connected, and the first transmission port of the third LiDAR and the third Ethernet port of the first Ethernet switch are electrically connected.

In some embodiments, the first LiDAR is further configured to transmit the first echo signal to the second LiDAR; the second LiDAR is configured to perform data fusion according to the first echo signal and the second echo signal to obtain the echo signal after data fusion. The system includes at least two LiDARs with data fusion capability, which can effectively improve the stability and reliability of the system.

In a second aspect, the present application discloses an autonomous driving device, including a vehicle body and a LiDAR system installed on the vehicle body.

In some embodiments, the vehicle body includes a roof section, a front section, side sections, and a rear section; the first LiDAR is installed on the roof section, and the second LiDAR is installed on the front section, side sections, or rear section of the vehicle body.

In the LiDAR system and autonomous driving device disclosed in this application, one LiDAR is configured to control other LiDARs, and the LiDAR is also configured to perform data fusion based on multiple echo signals, thereby achieving the coordinated work of multiple LiDARs and effectively meeting the car's all-round perception of the surrounding environment. The setting of redundant transmission links in the LiDAR system can ensure the normal data exchange and power supply between LiDARs, thereby effectively improving the stability and reliability of the LiDAR system.

BRIEF DESCRIPTION OF DRA WINGS

Figure 1:
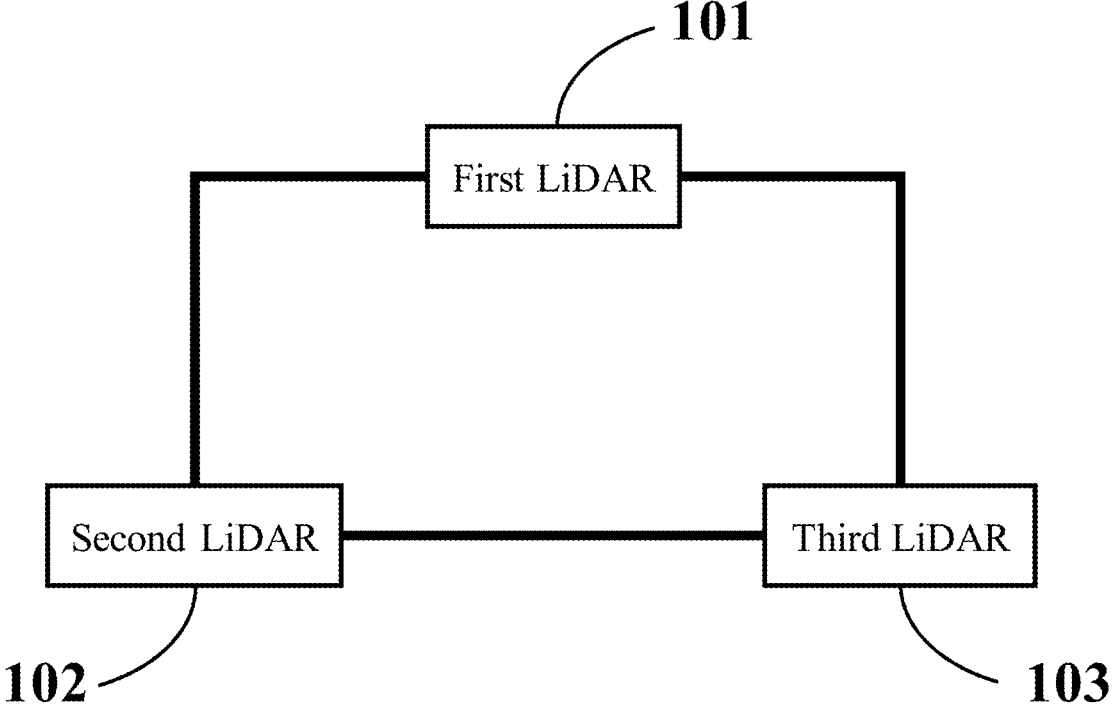
FIG. 1 is a schematic diagram of a LiDAR system disclosed in an embodiment of the present application.

Reference signs: 101, first LiDAR; 102, second LiDAR; 103, third LiDAR; 104, fourth LiDAR; 105, fifth LiDAR; 106, sixth LiDAR; 107, seventh LiDAR; 201, first Ethernet switch; 202, second Ethernet switch; 301, first Ethernet cable; 302, second Ethernet cable; 400, vehicle body.

DETAILED DESCRIPTION

The realization of automatic driving of vehicles is inseparable from the rapid development of sensors. Among them, LiDAR with strong anti-interference, high precision and high sensitivity is one of the core sensors of the vehicle's intelligent perception system. However, the intelligent driving solution based on a single LiDAR can only obtain road information within a certain angle and distance range in front of the vehicle with high precision, and cannot accurately obtain obstacle information in other directions of the vehicle. Although the addition of multiple LiDARs can obtain road information in a wider range, the collaborative work between multiple LiDARs still faces great challenges.

In order to realize the collaborative work of multiple LiDARs, embodiments of this application disclose a LiDAR system. One LiDAR in the system is configured to control other LiDARs. The LiDAR is also configured to perform data fusion based on multiple echo signals, thereby realizing the collaborative work of multiple LiDARs. In addition, the setting of redundant transmission links in the system effectively improves the stability and reliability of the system.

In some embodiments, a LiDAR system includes a first LiDAR and a second LiDAR, where each LiDAR includes a first transmission port and a second transmission port. The first LiDAR is configured to send a control instruction to the first transmission port of the second LiDAR or the second transmission port of the second LiDAR through the first transmission port of the first LiDAR, and the first LiDAR is also configured to receive the first echo signal. The second LiDAR is configured to emit a laser beam according to the control instruction and receive the second echo signal according to the laser beam. The second LiDAR is also configured to transmit the second echo signal to the first LiDAR. The first LiDAR is also configured to perform data fusion based on the first echo signal and the second echo signal to obtain the echo signal after data fusion.

In an embodiment, the first LiDAR is configured to obtain the first point cloud based on the first echo signal. The first LiDAR is also configured to obtain a second point cloud based on the second echo signal. The first LiDAR is also configured to perform point cloud fusion based on the first point cloud and the second point cloud to obtain a fused third point cloud.

In an embodiment, the second LiDAR is configured to adjust the emission times of laser beams according to the control instruction for multiple scanning operations, thereby obtaining multiple second echo signals. The second LiDAR is also configured to transmit the multiple second echo signals to the first LiDAR. The first LiDAR is also configured to perform point cloud fusion based on multiple second echo signals to obtain a dense point cloud corresponding to the scanning field of view of the second LiDAR.

In an embodiment, the second LiDAR is further configured to send a control instruction to the first LiDAR, and the first LiDAR is further configured to emit a laser beam according to the control instruction and transmit the received first echo signal to the second LiDAR. The second LiDAR is also configured to perform data fusion based on the first echo signal and the second echo signal to obtain the echo signal after data fusion.

In some embodiments, as shown in FIG. 1, a LiDAR system includes a first LiDAR 101, a second LiDAR 102, and a third LiDAR 103. The first transmission port of the first LiDAR 101 and the second transmission port of the second LiDAR 102 are electrically connected. The first transmission port of the second LiDAR 102 and the second transmission port of the third LiDAR 103 are electrically connected. The first transmission port of the third LiDAR 103 and the second transmission port of the first LiDAR 101 are electrically connected.

In an embodiment, the first LiDAR 101 is configured to send control instructions to the second transmission port of the second LiDAR 102 and the first transmission port of the third LiDAR 103 respectively. The second LiDAR 102 is configured to transmit the received second echo signal to the first transmission port of the first LiDAR 101 according to the control instructions. The third LiDAR 103 is configured to transmit the received third echo signal to the second transmission port of the first LiDAR 101 according to the control instructions. The first LiDAR 101 is also configured to perform data fusion based on the first echo signal, the second echo signal and the third echo signal to obtain a data-fused echo signal.

In an embodiment, the first LiDAR 101 is configured to transmit the control instruction to the first transmission port of the second LiDAR 102 through the third LiDAR 103. The second LiDAR 102 is also configured to emit a laser beam according to the control instruction and transmit the received second echo signal to the second transmission port of the first LiDAR 101 through the third LiDAR 103. In the LiDAR system shown in FIG. 1, the first LiDAR 101 is configured to control the other two LiDARs to scan and control the transmission direction of data between the other two LiDARs, thereby realizing the collaborative work of multiple LiDARs. In addition, there are two data transmission links between one LiDAR and another LiDAR. Even if one of the transmission links fails, data interaction can be achieved through the other transmission link, effectively improving the stability of multi-LiDAR collaborative work.

Figure 2:
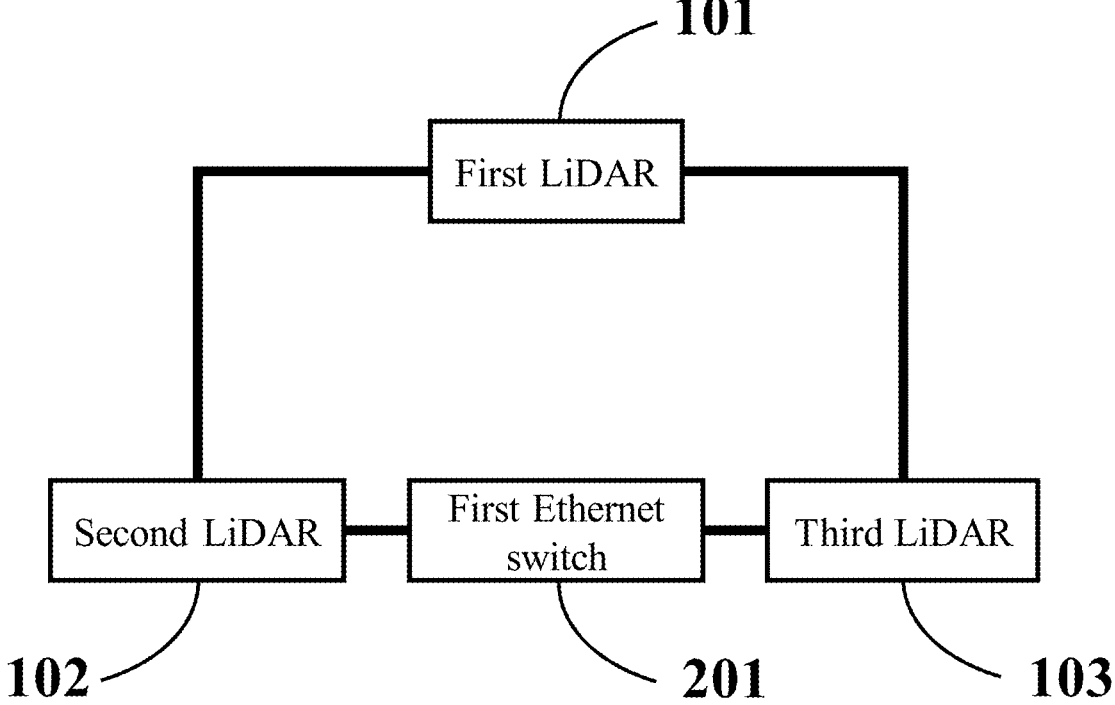
FIG. 2 is a schematic diagram of a LiDAR system disclosed in an embodiment of the present application.

In some embodiments, the LiDAR system further includes an Ethernet switch. As shown in FIG. 2, the LiDAR system further includes a first Ethernet switch 201, and the first Ethernet switch 201 includes a first Ethernet port and a second Ethernet port. The first transmission port of the first LiDAR 101 is electrically connected to the second transmission port of the second LiDAR 102, and the first transmission port of the second LiDAR 102 is electrically connected to the first Ethernet port of the first Ethernet switch 201. The second Ethernet port of the first Ethernet switch 201 is electrically connected to the second transmission port of the third LiDAR 103, and the first transmission port of the third LiDAR 103 is electrically connected to the second transmission port of the first LiDAR 101. In one example, the second LiDAR 102 is configured to perform multiple scans according to the control instructions to obtain multiple second echo signals. The second LiDAR 102 is also configured to transmit part of the second echo signals to the first transmission port of the first LiDAR 101 according to the control instruction. The second LiDAR 102 is also configured to transmit part of the second echo signals to the second transmission port of the first LiDAR 101 through the first Ethernet switch 201 and the third LiDAR 103 according to the control instruction. The first Ethernet switch 201 serves as a communication relay node and can be configured to coordinate the data interaction process between LiDARs to avoid network congestion and data loss due to insufficient transmission bandwidth of the transmission port.

Figure 3:
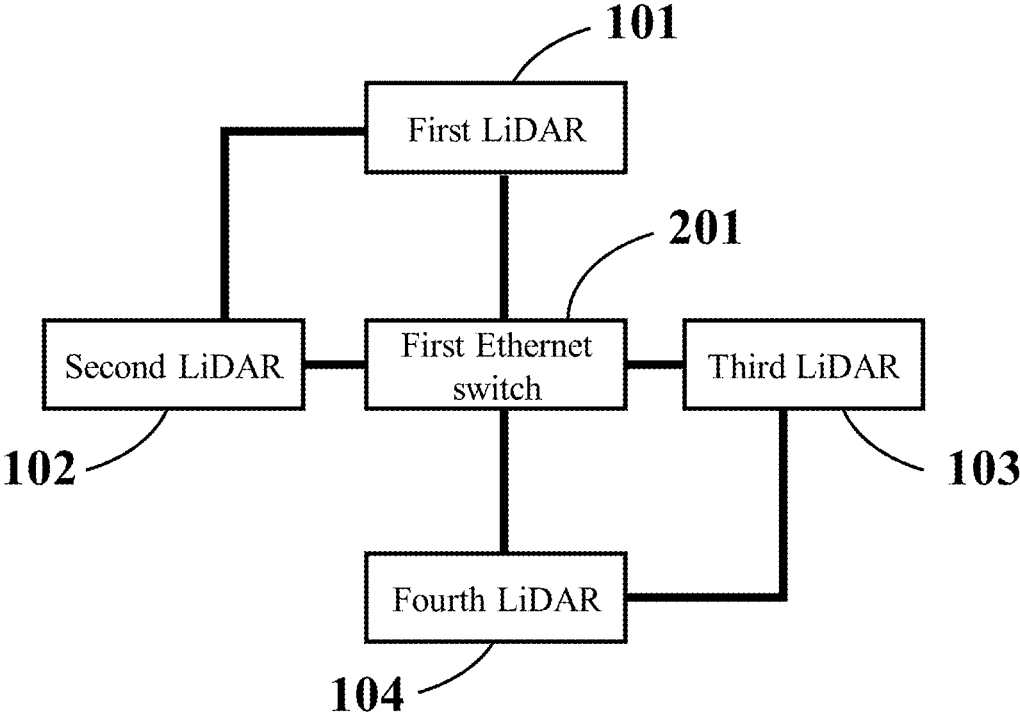
FIG. 3 is a schematic diagram of a LiDAR system disclosed in an embodiment of the present application.

In an embodiment, the LiDAR system further includes a fourth LiDAR, and the first Ethernet switch 201 further includes a third Ethernet port and a fourth Ethernet port. As shown in FIG. 3, the first transmission port of the first LiDAR 101 is electrically connected to the second transmission port of the second LiDAR 102, the first transmission port of the second LiDAR 102 is electrically connected to the first Ethernet port of the first Ethernet switch 201, and the second Ethernet port of the first Ethernet switch 201 is electrically connected to the second transmission port of the first LiDAR 101. The first transmission port of the third LiDAR 103 is electrically connected to the second transmission port of the fourth LiDAR 104, the first transmission port of the fourth LiDAR 104 is electrically connected to the third Ethernet port of the first Ethernet switch 201, and the fourth Ethernet port of the first Ethernet switch 201 is electrically connected to the second transmission port of the third LiDAR 103.

In an embodiment, the first LiDAR 101 is configured to send control instructions to the first transmission port of the second LiDAR 102, the second transmission port of the third LiDAR 103, and the first transmission port of the fourth LiDAR 104 through the first Ethernet switch 201, respectively, to control multiple LiDARs to scan.

In an embodiment, the first LiDAR 101 is configured to transmit the control instruction to the second transmission port of the third LiDAR 103 or the first transmission port of the fourth LiDAR 104 through the first Ethernet switch 201. The third LiDAR 103 or the fourth LiDAR 104 is configured to transmit the received echo signal to the second transmission port of the first LiDAR 101 or the first transmission port of the second LiDAR 102 through the first Ethernet switch 201. Compared with the LiDAR system shown in FIG. 2, any two LiDARs in the LiDAR system shown in FIG. 3 can realize data interaction through the first Ethernet switch 201, which can further improve the stability and flexibility of the system.

Figure 4:
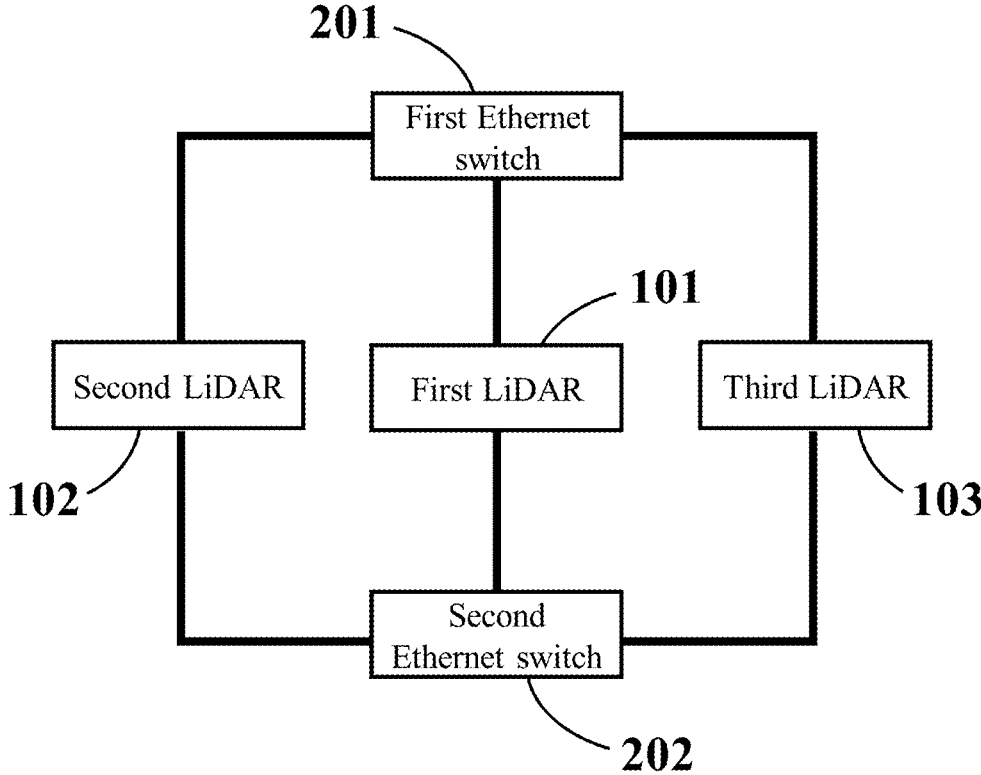
FIG. 4 is a schematic diagram of a LiDAR system disclosed in an embodiment of the present application.

In an embodiment, the LiDAR system shown in FIG. 2 further includes a second Ethernet switch, and each Ethernet switch further includes a third Ethernet port. As shown in FIG. 4, the first transmission port of the first LiDAR 101 is electrically connected to the first Ethernet port of the first Ethernet switch 201, and the second transmission port of the first LiDAR 101 is electrically connected to the first Ethernet port of the second Ethernet switch 202. The first transmission port of the second LiDAR 102 is electrically connected to the second Ethernet port of the first Ethernet switch 201, and the second transmission port of the second LiDAR 102 is electrically connected to the second Ethernet port of the second Ethernet switch 202. The first transmission port of the third LiDAR 103 is electrically connected to the third Ethernet port of the first Ethernet switch 201, and the second transmission port of the third LiDAR 103 is electrically connected to the third Ethernet port of the second Ethernet switch 202.

Figure 5:
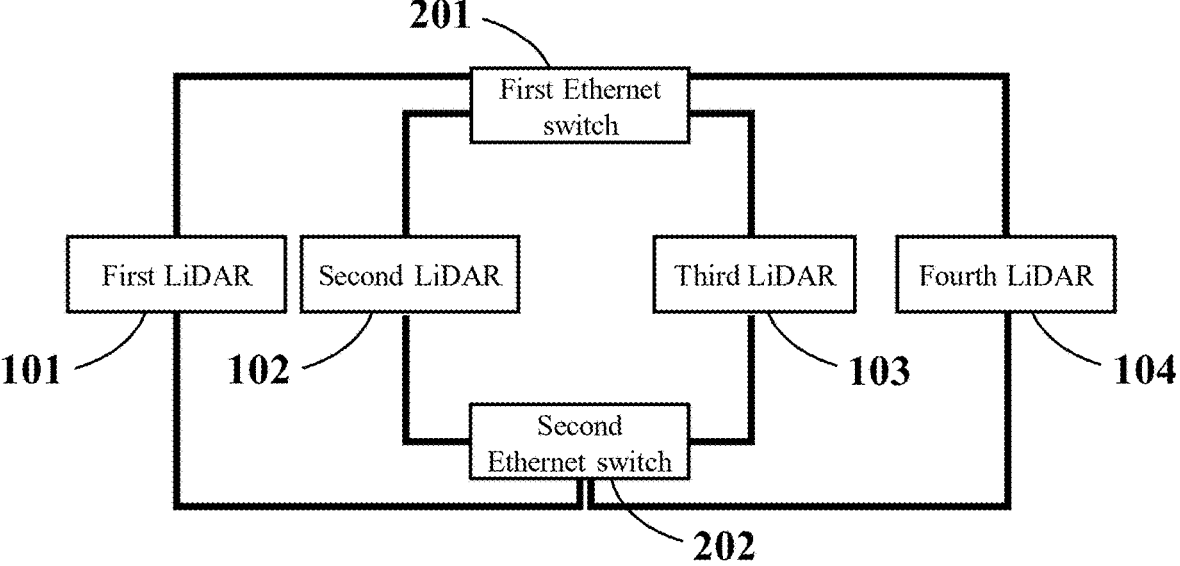
FIG. 5 is a schematic diagram of a LiDAR system disclosed in an embodiment of the present application.

In an embodiment, the LiDAR system shown in FIG. 4 further includes a fourth LiDAR 104, and each Ethernet switch further includes a fourth Ethernet port, as shown in FIG. 5, where the first transmission port of the fourth LiDAR 104 is electrically connected to the fourth Ethernet port of the first Ethernet switch 201, and the second transmission port of the fourth LiDAR 104 is electrically connected to the fourth Ethernet port of the second Ethernet switch 202.

In an embodiment, the first LiDAR 101 is configured to send the control instruction to the second LiDAR 102, the third LiDAR 103, and the fourth LiDAR 104 through the first Ethernet switch 201 or the second Ethernet switch 202. The second LiDAR 102 is configured to transmit the second echo signal to the first LiDAR 101 through the second Ethernet switch 202 according to the control instruction. The third LiDAR 103 is configured to transmit the third echo signal to the first LiDAR 101 through the first Ethernet switch 201 according to the control instruction, and the fourth LiDAR 104 is configured to transmit the fourth echo signal to the first LiDAR 101 through the first Ethernet switch 201 according to the control instruction. The first LiDAR 101 is configured to control other LiDARs to transmit the received echo signal to the first Ethernet switch 201 or the second Ethernet switch 202, so as to realize the control of the data transmission direction, improve the flexibility of data interaction within the system, and avoid network congestion due to insufficient transmission bandwidth of the transmission port or Ethernet port.

Figure 6:
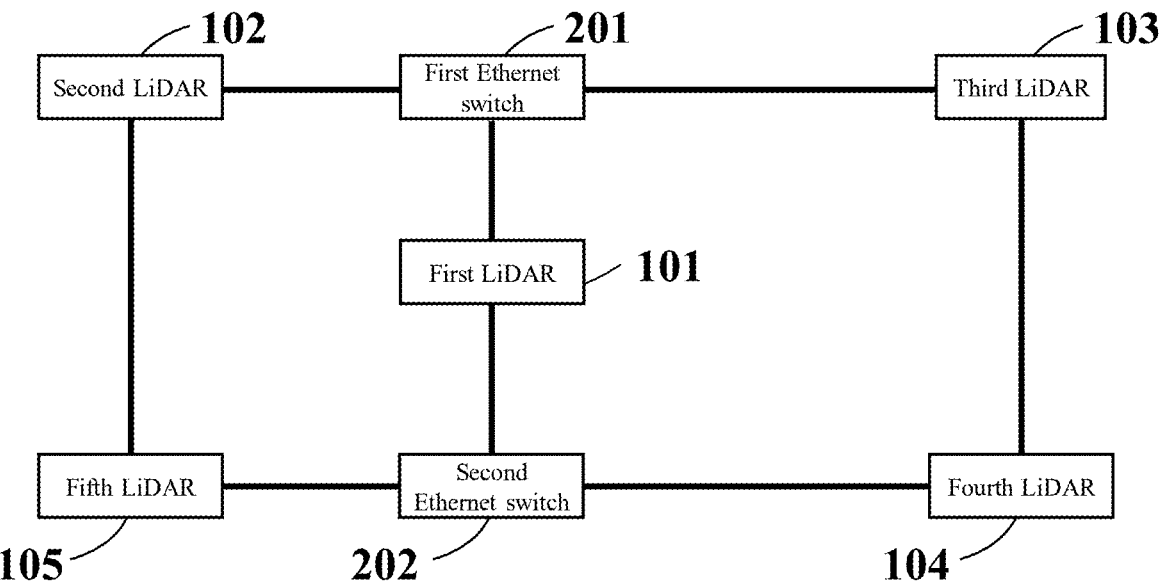
FIG. 6 is a schematic diagram of a LiDAR system disclosed in an embodiment of the present application.

In an embodiment, the LiDAR system shown in FIG. 6 further includes a fourth LiDAR and a fifth LiDAR. Multiple LiDARs and two Ethernet switches form a distributed communication structure. As shown in FIG. 6, the first transmission port of the first LiDAR 101 is electrically connected to the first Ethernet port of the first Ethernet switch 201, and the second transmission port of the first LiDAR 101 is electrically connected to the first Ethernet port of the second Ethernet switch 202. The second Ethernet port of the first Ethernet switch 201 is electrically connected to the first transmission port of the second LiDAR 102, the second transmission port of the second LiDAR 102 is electrically connected to the first transmission port of the fifth LiDAR 105, and the second transmission port of the fifth LiDAR 105 is electrically connected to the second Ethernet port of the second Ethernet switch 202. The third Ethernet port of the second Ethernet switch 202 is electrically connected to the second transmission port of the fourth LiDAR 104, the first transmission port of the fourth LiDAR 104 is electrically connected to the second transmission port of the third LiDAR 103, and the first transmission port of the third LiDAR 103 is electrically connected to the third Ethernet port of the first Ethernet switch 201.

In some embodiments, in the LiDAR system shown in FIGS. 1 to 6, one transmission port and another transmission port are connected based on an Ethernet cable. One transmission port and one Ethernet port are connected based on an Ethernet cable. The Ethernet cable supports Power over Ethernet (PoE) for bidirectional data transmission and power transmission; or the Ethernet cable is a single pair Ethernet (SPE) cable including a pair of twisted pairs, compatible with the Power on Data Line (PoDL) standard, for bidirectional data transmission and power transmission.

In an embodiment, the first LiDAR 101 is configured to power the first Ethernet switch 201 and the second Ethernet switch 202 respectively through two Ethernet cables. The first Ethernet switch 201 is configured to transmit power to the second LiDAR 102 through an Ethernet cable, and the second LiDAR 102 is configured to transmit power to the fifth LiDAR 105 through an Ethernet cable; or the second Ethernet switch 202 is configured to transmit power to the fifth LiDAR 105 through an Ethernet cable.

In an embodiment, the second Ethernet switch 202 is configured to power the first LiDAR 101, the second LiDAR 102, and the third LiDAR 103 through three Ethernet cables. The second LiDAR 102 is configured to supply power to the fifth LiDAR through an Ethernet cable; or the first LiDAR 101 is configured to supply power to the second Ethernet switch 202 through an Ethernet cable, and the second Ethernet switch 202 is configured to supply power to the fifth LiDAR 105 through an Ethernet cable.

In an embodiment, the switch is a switch that supports the high-speed serial computer expansion bus standard (Peripheral Component Interconnect Express, PCIe), which is configured for data transmission and data format conversion. A LiDAR and another LiDAR are connected based on a PCIe cable, and a LiDAR and a switch are connected based on a PCIe cable, where the PCIe cable has a power supply function. This cable for power supply and data transmission multiplexing can effectively reduce the complexity of wiring in the system. For a single LiDAR, the power input can be through either of the two cables connected to the single LiDAR. The setting of this redundant transmission link can improve the stability of power transmission while improving the stability of data transmission, effectively improving the reliability of the system.

In an embodiment, the present application discloses an autonomous driving device, including a central controller, a vehicle body, and a LiDAR system installed on the vehicle body.

Figure 7:
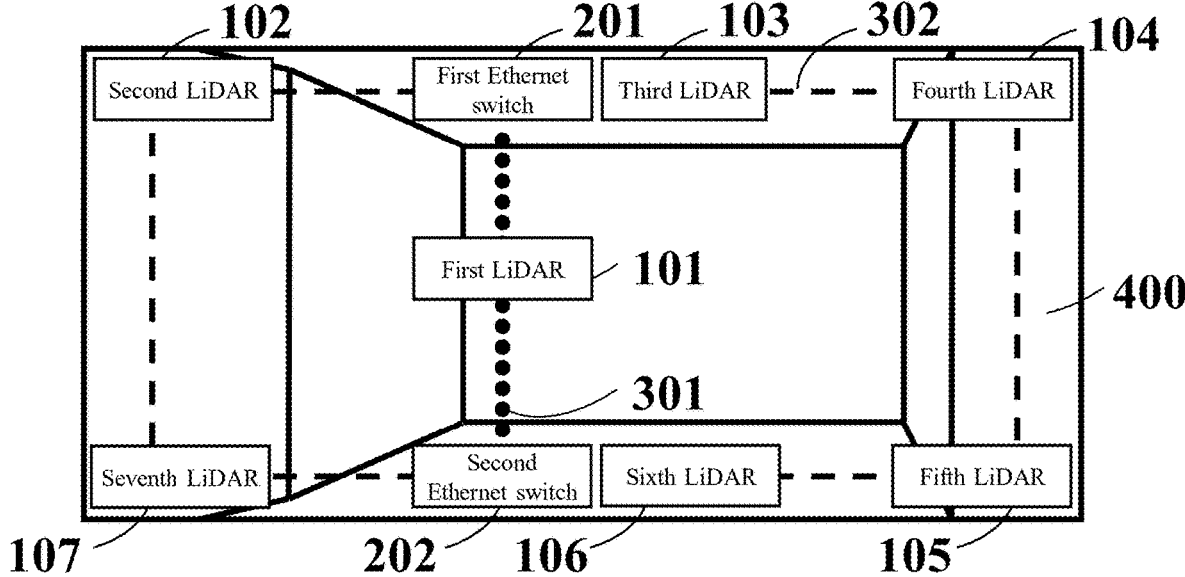
FIG. 7 is a schematic diagram of an autonomous driving device disclosed in an embodiment of the present application.

In an embodiment, as shown in FIG. 7, the vehicle body 400 includes a roof section, a front section, side sections, and a rear section. The first LiDAR 101 is installed on the roof section, such as above the vehicle windshield, and the second LiDAR 102 and the seventh LiDAR 107 are placed oppositely and installed on the front section, such as below the front headlight of the vehicle. The third LiDAR 103 and the sixth LiDAR 106 are placed oppositely and installed on the side sections, such as below the rearview mirror of the vehicle. The fourth LiDAR 104 and the fifth LiDAR 105 are placed oppositely and installed at the rear section, such as below the rear headlight of the vehicle. The first LiDAR 101 is configured to collect obstacle information within a long range in front of the vehicle. Other LiDARs are configured as blind LiDARs to collect obstacle information within a close range around the vehicle.

In an embodiment, as shown in FIG. 7, multiple LiDARs and two Ethernet switches form a distributed communication structure. Among them, the first LiDAR 101 serves as the communication master node, and the other LiDARs and two Ethernet switches serve as communication slave nodes. Data interaction between the first LiDAR 101 and each slave node is based on a distributed communication structure. Among them, the first LiDAR 101 is connected to the first Ethernet switch 201 and the second Ethernet switch 202 respectively based on two first Ethernet cables 301. The two slave nodes are connected based on a second Ethernet cable 302. The transmission bandwidth of the first Ethernet cable 301 is greater than or equal to the transmission bandwidth of the second Ethernet cable 302. Both the first Ethernet cable 301 and the second Ethernet cable 302 support the PoE power supply standard or the PoDL power supply standard. In the actual working process, a single LiDAR will generate a large amount of real-time data. The requirements of the first Ethernet cable 301 for data transmission bandwidth and transmission rate are significantly higher than those of the second Ethernet cable 302. Therefore, cables with different transmission bandwidths and transmission rates are required to meet the data interaction requirements. In addition, the reuse of data transmission links and power supply links also means that the LiDAR system does not need to provide an additional power supply interface for the vehicle. It only needs to power one LiDAR or one Ethernet switch, effectively reducing the complexity and weight of the vehicle's wiring harness.

In an embodiment, the central controller is configured to send scanning instructions to the first LiDAR 101. The first LiDAR 101 is also configured to perform point cloud fusion according to the first echo signal and the echo signals of one or more other LiDARs to obtain a fused point cloud. The first LiDAR 101 is also configured to send the fused point cloud to the central controller. The central controller is also configured to obtain obstacle information around the vehicle based on the fused point cloud, and perform obstacle identification or path planning. In another example, the first LiDAR 101 is also configured to control the third LiDAR 103 to perform multiple scans according to the scanning instruction to obtain multiple third echo signals. The first LiDAR 101 is also configured to perform point cloud fusion according to multiple third echo signals to obtain a dense point cloud in the scanning field of view corresponding to the third LiDAR 103. In another example, the fourth LiDAR 104 is configured to emit a laser beam according to the control instruction and transmit the received fourth echo signal to the third LiDAR 103. The third LiDAR 103 is configured to emit a laser beam and receive the third echo signal according to the control instruction. The third LiDAR 103 is also configured to perform the first point cloud fusion according to the third echo signal and the fourth echo signal to obtain the point cloud after the first point cloud fusion. The third LiDAR 103 is also configured to transmit the point cloud after the first point cloud fusion to the first LiDAR 101 through the first Ethernet switch 201. The first LiDAR 101 is also configured to obtain the first point cloud according to the first echo signal. The first LiDAR 101 is also configured to perform the second point cloud fusion according to the first point cloud and the point cloud after the first point cloud fusion to obtain the point cloud after the second point cloud fusion.

In the above embodiments, the system includes at least one LiDAR for data processing, receiving and sending laser pulses and transmitting data, and other LiDARs are only configured for receiving and sending laser pulses and transmitting data. Based on this LiDAR system with different specifications, it can effectively reduce the configuration cost of the whole vehicle and shorten the product development cycle.

In the description of the present application, it should be understood that, unless otherwise defined, all technical and scientific terms configured herein have the same meaning as those generally understood by technicians in the technical field of the present application. The terms configured in the present specification are only for the purpose of describing specific embodiments and are not intended to limit the present application. The terms "and/or" and "and/or" configured herein describe the association relationship of associated objects, indicating that three relationships may exist, for example, A and/or B can represent: A exists alone, A and B exist at the same time, and B exists alone. The character "/" generally indicates that the associated objects before and after are in an "or" relationship. The singular forms of "one" and "an" are also intended to include plural forms, unless the context clearly indicates otherwise. When the terms "comprising" and/or "including" are configured in this specification, it indicates that the features, elements and/or components are present, but does not exclude the presence or addition of one or more other features, elements, components, and/or their combinations, i.e., any and all combinations of one or more related listed items are included. The ordinal numbers such as "first" and "second" cited in the embodiments of the present application are merely identifiers, and do not refer to other meanings such as a specific order or implying relative importance.

In the present application, unless otherwise clearly specified and limited, the first feature "above" or "below" the second feature may include the first and second features being in direct contact, or the first and second features being in contact not directly but through another feature between them. Moreover, the first feature "above", "above" and "above" the second feature include the first feature being directly above and obliquely above the second feature, or simply indicates that the first feature is higher in level than the second feature. The first feature "below", "below" and "below" the second feature include the first feature being directly below and obliquely below the second feature, or simply indicates that the first feature is lower in level than the second feature. For those of ordinary skill in the art, the specific meanings of the above terms can be understood according to the specific circumstances. The "one or more embodiments" configured herein do not refer to the same embodiment, but are based on any suitable combination of specific features, structures or characteristics. The above are only exemplary embodiments of the present application and are not intended to limit the present application. Any modifications, equivalent substitutions and improvements made within the spirit and principles of the present application shall be included in the scope of protection of the present application.

What is claimed is:

1. A LiDAR system, comprising a first LiDAR and a second LiDAR, wherein:

each LiDAR comprises a first transmission port and a second transmission port;

the first LiDAR is configured to send a control instruction to the first transmission port of the second LiDAR or the second transmission port of the second LiDAR through the first transmission port of the first LiDAR, and the first LiDAR is configured to receive a first echo signal;

the second LiDAR is configured to emit a laser beam according to the control instruction and receive a second echo signal according to the laser beam, and the second LiDAR is configured to transmit the second echo signal to the first LiDAR; and the first LiDAR is configured to perform data fusion according to the first echo signal and the second echo signal to obtain an echo signal after data fusion.

2. The LiDAR system according to claim 1, further comprising a third LiDAR, wherein the first transmission port of the first LiDAR and the second transmission port of the second LiDAR are electrically connected, the first transmission port of the second LiDAR and the second transmission port of the third LiDAR are electrically connected, and the first transmission port of the third LiDAR and the second transmission port of the first LiDAR are electrically connected.

3. The LiDAR system according to claim 2, further comprising a first Ethernet switch, wherein:

the first Ethernet switch comprises a first Ethernet port and a second Ethernet port;

the first transmission port of the first LiDAR and the second transmission port of the second LiDAR are electrically connected, and the first transmission port of the second LiDAR and the first Ethernet port of the first Ethernet switch are electrically connected; and the second Ethernet port of the first Ethernet switch and the second transmission port of the third LiDAR are electrically connected, and the first transmission port of the third LiDAR and the second transmission port of the first LiDAR are electrically connected.

4. The LiDAR system according to claim 3, further comprising a fourth LiDAR, wherein:

the first Ethernet switch further comprises a third Ethernet port and a fourth Ethernet port;

the first transmission port of the first LiDAR and the second transmission port of the second LiDAR are electrically connected, the first transmission port of the second LiDAR and the first Ethernet port of the first Ethernet switch are electrically connected, and the second Ethernet port of the first Ethernet switch and the second transmission port of the first LiDAR are electrically connected; and the first transmission port of the third LiDAR and the second transmission port of the fourth LiDAR are electrically connected, the first transmission port of the fourth LiDAR and the third Ethernet port of the first Ethernet switch are electrically connected, and the fourth Ethernet port of the first Ethernet switch and the second transmission port of the third LiDAR are electrically connected.

5. The LiDAR system according to claim 3, further comprising a second Ethernet switch, wherein:

each Ethernet switch further comprises a third Ethernet port;

the first transmission port of the first LiDAR and the first Ethernet port of the first Ethernet switch are electrically connected, and the second transmission port of the first LiDAR and the first Ethernet port of the second Ethernet switch are electrically connected;

the first transmission port of the second LiDAR and the second Ethernet port of the first Ethernet switch are electrically connected, and the second transmission port of the second LiDAR and the second Ethernet port of the second Ethernet switch are electrically connected; and the first transmission port of the third LiDAR and the third Ethernet port of the first Ethernet switch are electrically connected, and the second transmission port of the third LiDAR and the third Ethernet port of the second Ethernet switch are electrically connected.

6. The LiDAR system according to claim 5, further comprising a fourth LiDAR, wherein:

each Ethernet switch further comprises a fourth Ethernet port; and the first transmission port of the fourth LiDAR and the fourth Ethernet port of the first Ethernet switch are electrically connected, and the second transmission port of the fourth LiDAR and the fourth Ethernet port of the second Ethernet switch are electrically connected.

7. The LiDAR system according to claim 5, further comprising a fourth LiDAR and a fifth LiDAR, wherein:

the first transmission port of the first LiDAR and the first Ethernet port of the first Ethernet switch are electrically connected, and the second transmission port of the first LiDAR and the first Ethernet port of the second Ethernet switch are electrically connected;

the second Ethernet port of the first Ethernet switch and the first transmission port of the second LiDAR are electrically connected, the second transmission port of the second LiDAR and the first transmission port of the fifth LiDAR are electrically connected, and the second transmission port of the fifth LiDAR and the second Ethernet port of the second Ethernet switch are electrically connected; and the third Ethernet port of the second Ethernet switch and the second transmission port of the fourth LiDAR are electrically connected, the first transmission port of the fourth LiDAR and the second transmission port of the third LiDAR are electrically connected, and the first transmission port of the third LiDAR and the third Ethernet port of the first Ethernet switch are electrically connected.

8. The LiDAR system according to claim 1, wherein:

the first LiDAR is configured to transmit the first echo signal to the second LiDAR; and the second LiDAR is configured to perform data fusion based on the first echo signal and the second echo signal to obtain an echo signal after data fusion.

9. An automatic driving device, comprising a vehicle body and a LiDAR system, wherein:

the LiDAR system comprises a first LiDAR and a second LiDAR, and each LiDAR comprises a first transmission port and a second transmission port;

the first LiDAR is configured to send a control instruction to the first transmission port of the second LiDAR or the second transmission port of the second LiDAR through the first transmission port of the first LiDAR, and the first LiDAR is configured to receive a first echo signal;

the second LiDAR is configured to emit a laser beam according to the control instruction and receive a second echo signal according to the laser beam;

the second LiDAR is configured to transmit the second echo signal to the first LiDAR; and the first LiDAR is configured to perform data fusion according to the first echo signal and the second echo signal to obtain an echo signal after data fusion.

10. The automatic driving device according to claim 9, wherein:

the vehicle body comprises a roof section, a front section, side sections, and a rear section; and the first LiDAR is installed on the roof section, and the second LiDAR is installed on the front section, side sections, or rear section.

* * * * *